E. VON LEPEL.
APPARATUS FOR PRODUCING RAPID ELECTRIC OSCILLATIONS.
APPLICATION FILED AUG. 4, 1908.

1,043,117.  Patented Nov. 5, 1912.

UNITED STATES PATENT OFFICE.

EGBERT von LEPEL, OF BERLIN, GERMANY.

APPARATUS FOR PRODUCING RAPID ELECTRIC OSCILLATIONS.

1,043,117.   Specification of Letters Patent.   Patented Nov. 5, 1912.

Application filed August 4, 1908. Serial No. 446,959.

*To all whom it may concern:*

Be it known that I, EGBERT VON LEPEL, engineer, a subject of the King of Prussia, German Empire, residing at 9 Traunsteinerstrasse, Berlin W., Germany, have invented certain new and useful Improvements in Apparatus for Producing Rapid Electric Oscillations.

Numerous apparatus are known by means of which an alternating current of a high period of vibration is produced by a direct current in such a manner that an oscillatory circuit is excited by an electric arc or by a similar process of discharge. But hitherto, there has been known no producer of oscillations which consists of metal electrodes and is able to produce a power of more than 100 watts with wave lengths of 1000 meters and below as they are used in wireless telegraphy, without employing an air-blast or the like.

Figure 1:
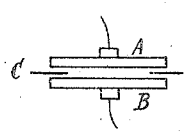
Figure 2:
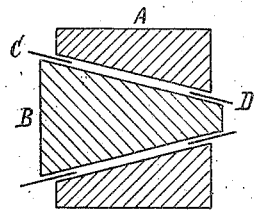

In the accompanying drawings: Figure 1 is a side view of a pair of electrodes embodying my invention; Fig. 2 a longitudinal section through a modified form of the electrodes, and Figs. 3–6 are wiring diagrams illustrating various combinations in which the electrode may be used.

With my improved electrodes their distance apart is to be taken very small as compared with their active surface, and is to be equal at all points of same. Therefore, the electrodes are appropriately formed by two disks A and B (Fig. 1), or by two cones A and B (Fig. 2), one being in the other, or by two concentric spherical surfaces, or other suitable arrangement of opposing surfaces. The electrodes may consist of steel, copper, brass and other metals, the positive electrode also of carbon. The space between the electrodes may be filled with air. Filling this space with other gases or liquid insulators has not been found particularly efficacious. In case of small powers, it is not necessary to cool the electrodes. The form of discharge seems to be between the electric arc and the electric spark. The distance between the electrodes may be taken so small as to be broken down at the working voltage, so that the generator starts up without bringing the electrodes into contact with each other. This is still possible at a voltage of 220 volts, the distance of the electrodes being then equal to fractions of one millimeter. Therefore, telegraphing according to the invention is operated in the same manner as ordinary telegraphy that is, by establishing and interrupting the working current. For the same reason, the apparatus is able to work with an interrupted direct current or alternating current, unless the oscillations are used for telephoning.

When the apparatus is working, the discharge must be prevented from coming to the edges of the electrodes as they then turn into a long and ineffectual electric arc. For this purpose, a strip C (Fig. 1) or a pair of strips C, D (Fig. 2) of an insulating material, particularly paper, is brought between the electrodes in such a manner that it limits a parallel part of the surface of the electrodes, and projects out of the edges of the electrodes, said strip or strips being gradually used up.

Figure 3:
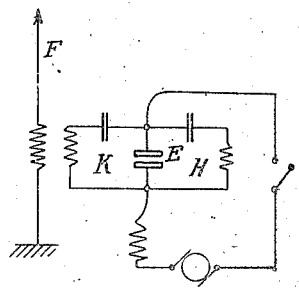
Figure 4:
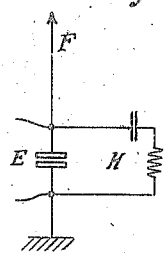
Figure 5:
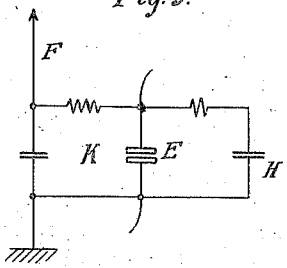

It has been found that the output drawn from the oscillatory circuit becomes greater and can be easily brought up to one kilowatt, or more, if a second oscillatory circuit (auxiliary circuit) is connected in parallel, no power being drawn from the latter one. The natural vibration of the latter circuit may be equal to that of the working circuit or a harmonic of same, or it may have any other relation. It is however advantageous to have the electric magnitude of the auxiliary circuit a multiple of that of the working circuit, the resulting period of the vibration depending on the electric constants of both circuits. In Fig. 3, E is the source of oscillations, K is the working circuit from which oscillatory power is drawn by coupling it with an aerial wire or antenna F, and H is the auxiliary circuit. In Fig. 4 the aerial wire itself forms the working circuit. According to the connection represented by Fig. 5, the aerial wire is connected to a condenser. Numerous similar connections are still possible.

Figure 6:
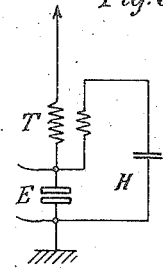

An effect particularly favorable is produced, if the working circuit is inductively coupled with the auxiliary circuit. Such an arrangement for exciting the aerial wire is shown in Fig. 6, in which T is the transformer serving for coupling, the manner of acting being different according to the direction of winding of the transformer coils.

What I claim and desire to secure by Letters Patent of the United States is:—

1. The combination of spark gap elements and means to limit the active areas of spark discharge in the same.

2. Apparatus for producing continuous or nearly continuous oscillations from direct or alternating current, comprising a pair of metal electrodes the acting surfaces of which are parallel to one another, and an insulator between the edges of the electrodes, constituting means to determine a separation of the electrodes such that ignition takes place without a preceding contact of the same.

3. Apparatus for producing continuous or nearly continuous electric oscillations from direct or alternating current, comprising in combination spark gap elements, means to limit the active areas of discharge on the same and a working circuit and an auxiliary circuit connected in shunt with said spark gap elements.

4. Apparatus for producing continuous or nearly continuous electric oscillations from direct or alternating current, comprising in combination a pair of metal electrodes the acting surfaces of which are parallel to one another, and means to space these surfaces apart so that ignition takes place without a preceding contact of the electrodes, and to limit the active areas of discharge on the said electrodes, and a working circuit and an auxiliary circuit connected in shunt with said electrodes, the working circuit being coupled inductively with the auxiliary circuit.

Signed by me at Berlin, Germany, this 21st day of July 1908.

EGBERT von LEPEL.

Witnesses:
  HENRY HASPER,
  ARTHUR SCHROEDER.